US010936575B2

(12) United States Patent
Ince et al.

(10) Patent No.: US 10,936,575 B2
(45) Date of Patent: *Mar. 2, 2021

(54) TIMESTAMP NORMALIZED COUNTER DATA

(71) Applicant: Time Warner Cable Enterprises LLC, St. Louis, MO (US)

(72) Inventors: Kamil Ince, Herndon, VA (US); Kirk Erichsen, Greenwood Village, CO (US); Tushar Nakhre, Herndon, VA (US); David Taiyung Kao, Ashburn, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 181 days.

This patent is subject to a terminal disclaimer.

(21) Appl. No.: 16/240,762

(22) Filed: Jan. 6, 2019

(65) Prior Publication Data

US 2019/0155800 A1 May 23, 2019

Related U.S. Application Data

(63) Continuation of application No. 14/306,700, filed on Jun. 17, 2014, now Pat. No. 10,185,734.

(51) Int. Cl.
*G06F 16/00* (2019.01)
*G06F 16/23* (2019.01)
*G06F 16/25* (2019.01)

(52) U.S. Cl.
CPC ........ *G06F 16/2322* (2019.01); *G06F 16/254* (2019.01)

(58) Field of Classification Search
None
See application file for complete search history.

(56) References Cited

U.S. PATENT DOCUMENTS

| 7,792,963 | B2 | 9/2010 | Gould | |
|---|---|---|---|---|
| 8,549,119 | B1 | 10/2013 | Singh et al. | |
| 2003/0056217 | A1 | 3/2003 | Brooks | |
| 2006/0130107 | A1 | 6/2006 | Gonder | |
| 2007/0217436 | A1 | 9/2007 | Markley | |
| 2008/0052387 | A1* | 2/2008 | Heinz | H04L 67/22 709/223 |
| 2009/0248794 | A1 | 10/2009 | Helms | |
| 2010/0312892 | A1* | 12/2010 | Woundy | H04L 41/0893 709/226 |
| 2010/0313236 | A1 | 12/2010 | Straub | |

(Continued)

OTHER PUBLICATIONS

Internet Protocol Detail Record, downloaded from http://en.wikipedia.org/wiki/IPDR on Apr. 16, 2014, pp. 1-3.

(Continued)

*Primary Examiner* — Anhtai V Tran
(74) *Attorney, Agent, or Firm* — Otterstedt, Wallace & Kammer, LLP

(57) ABSTRACT

A method including collecting, from a cable modem termination system (CMTS), counter data corresponding to usage of a network resource, wherein the counter data includes timestamp data, converting the counter data into timestamp normalized counter data by dividing the counter data among a plurality of buckets according to the timestamp data, and storing the timestamp normalized counter data.

17 Claims, 12 Drawing Sheets

(56) References Cited

U.S. PATENT DOCUMENTS

2012/0303555 A1   11/2012   Yakout et al.
2015/0363451 A1   12/2015   Ince et al.

OTHER PUBLICATIONS

Simple Network Management Protocol, downloaded from http://en.wikipedia.org/wiki/Snmp on Apr. 16, 2014, pp. 1-9.
Internet in Canada, downloaded from http://en.wikipedia.org/wiki/Usage_Based_Billing_(UBB) on Apr. 16, 2014, pp. 1-3.

* cited by examiner

TIMESTAMP NORMALIZED COUNTER DATA

CROSS-REFERENCE TO RELATED APPLICATION(S)

This application is a continuation of U.S. application Ser. No. 14/306,700 filed Jun. 17, 2014. The complete disclosures of U.S. application Ser. No. 14/306,700 is expressly incorporated herein by reference in its entirety for all purposes.

FIELD OF THE INVENTION

The present invention relates generally to the electrical, electronic, and computer arts, and more particularly relates to enhanced counter data in a network system.

BACKGROUND OF THE INVENTION

Conventionally, a cable network predominantly operated as a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this disclosure in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Within IP networks, one method for gleaming information (e.g., service usage) is the Internet Protocol Detail Record (IPDR).

SUMMARY OF THE INVENTION

Principles of the present invention provide a system, method, and computer program product for timestamp normalized data in a content network. In one aspect, an exemplary method includes collecting, from a cable modem termination system (CMTS), counter data corresponding to usage of a network resource, wherein the counter data includes timestamp data, converting the counter data into timestamp normalized counter data by dividing the counter data among a plurality of buckets according to the timestamp data, and storing the timestamp normalized counter data. In another aspect, an exemplary network system includes a cable modem termination system (CMTS) providing a network resource to at least one subscriber of the network system, a data warehouse, a collector collecting, from the CMTS, counter data corresponding to usage of the network resource, wherein the counter data includes timestamp data, and a mediator configured to timestamp and normalize the counter data, wherein the collector and the mediator are disposed between the CMTS and the data warehouse.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an intermediary dynamic host configuration protocol relay device) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

enabling a correlation and validation among time series data from multiple data sources with different temporal granularity and irregularity, and reducing overhead by limiting or eliminating data-pulling via SNMP from the access systems for capacity management of access networks.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Embodiments of the invention may be employed in a variety of settings. A non-limiting exemplary embodiment will be described within the context of a cable multiple system operator (MSO) providing one or more networks including one or more content-based networks. It is to be emphasized that one or more embodiments have applicability wherever service usage data is needed in a network, and can be used in connection with many different kinds of networks besides content networks, such as networks carrying primarily or solely data. In one exemplary embodiment of the present invention, Internet Protocol Detail Record (IPDR) data is utilized for Usage-Based Billing (UBB) purposes, wherein raw data is enriched through the processing of the data in a timestamp normalized regime, which enables aggregated data volume analytics (for example, enhanced IPDR reporting).

Figure 1:
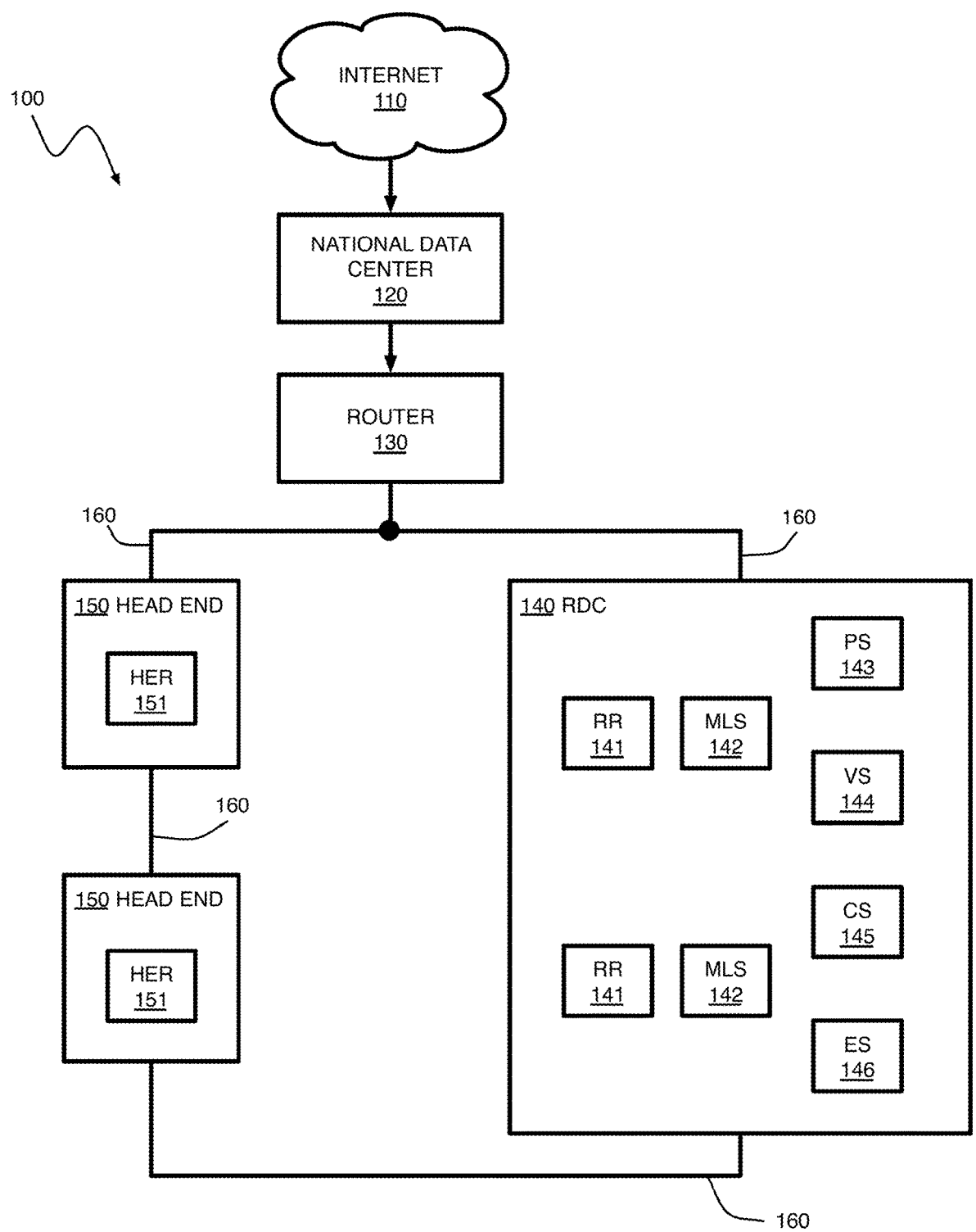
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 100, according to an aspect of the invention. System 100 includes a regional data center (RDC) 140, and one or more divisions, represented by division head ends 150. RDC 140 and head ends 150 are interconnected by a network 160; by way of example and not limitation, a dense wavelength division multiplex (DWDM) network. Elements 140, 150 on network 160 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 110; for example, via router 130. In one or more non-limiting exemplary embodiments, router 130 is a point-of-presence ("POP") router; for example, of the kind available from Juniper Networks, Inc., Sunnyvale, Calif., USA.

Head ends 150 may each include a head end router (HER) 151 which interfaces with network 160. Head end routers 151 are omitted from figures below to avoid clutter.

RDC 140 may include one or more provisioning servers (PS) 143, one or more Video Servers (VS) 144, one or more content servers (CS) 145, and one or more e-mail servers (ES) 146. The same may be interconnected to one or more RDC routers (RR) 141 by one or more multi-layer switches (MLS) 142. RDC routers 141 interconnect with network 160.

A national data center (NDC) 120 is provided in some instances; for example, between router 130 and Internet 110.

Figure 2:
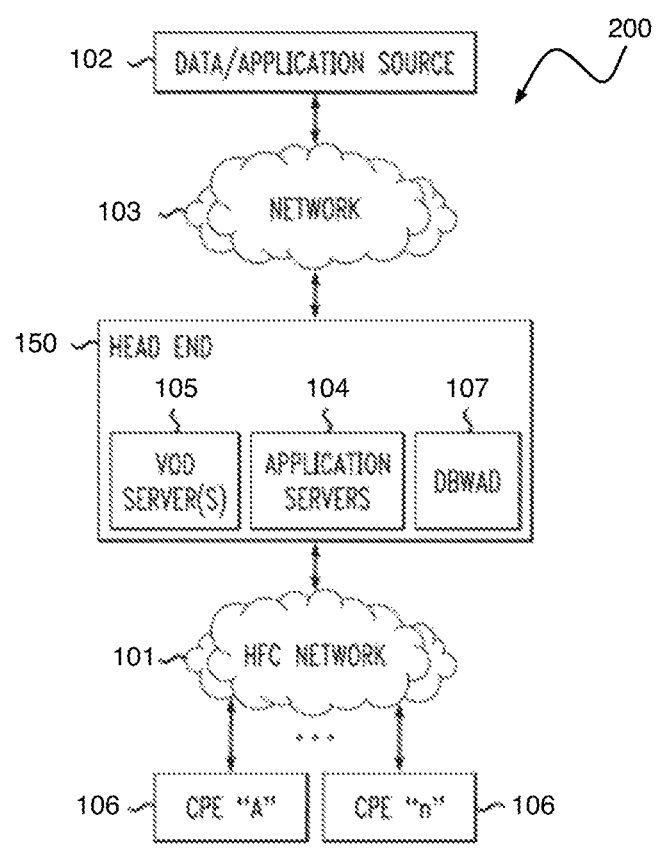
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 200 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 103. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 103 may correspond to network 160 of FIG. 1, and the data and application origination point may be, for example, within NDC 120, RDC 140, or on the Internet 110. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Also included (for example, in head end 150) is a dynamic bandwidth allocation device (DBWAD) 107 such as a global session resource manager, which is itself a non-limiting example of a session resource manager.

Figure 3:
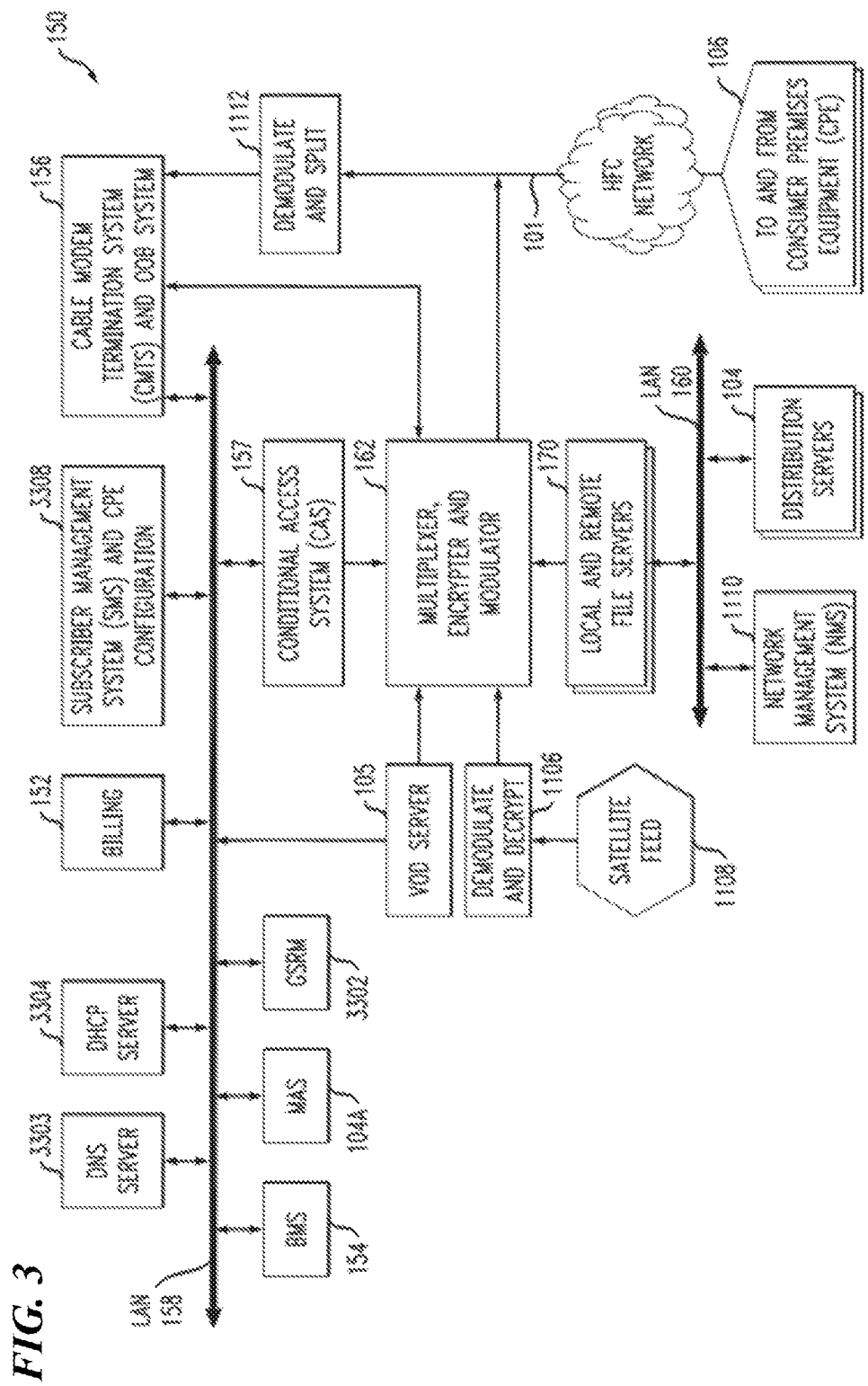
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 151, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application of one or more embodiments. However, one or more embodiments are generally applicable to IP transport of data, regardless of what kind of functionality is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 107 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
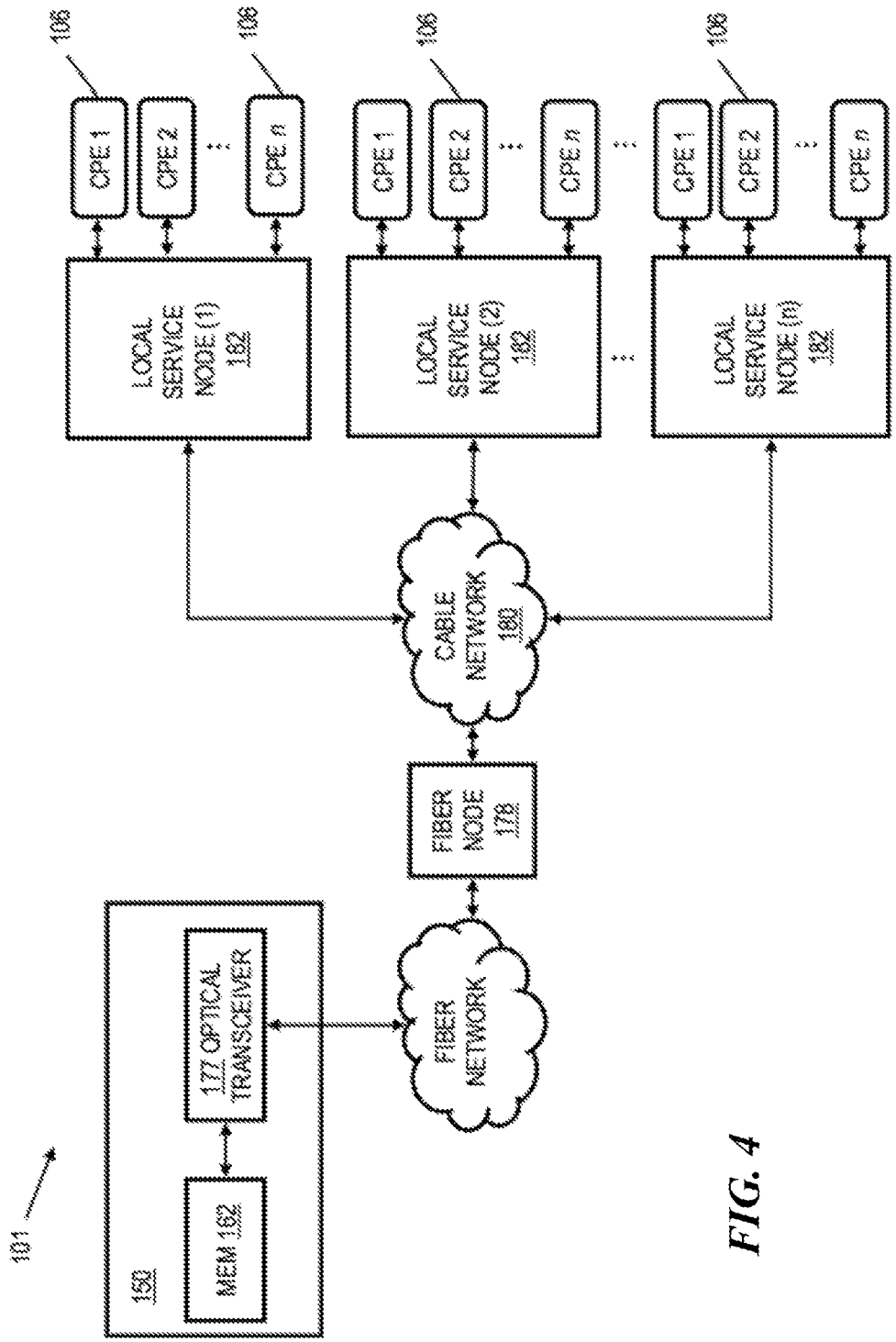
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010/0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 107.

US Patent Publication 2009/0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007/0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
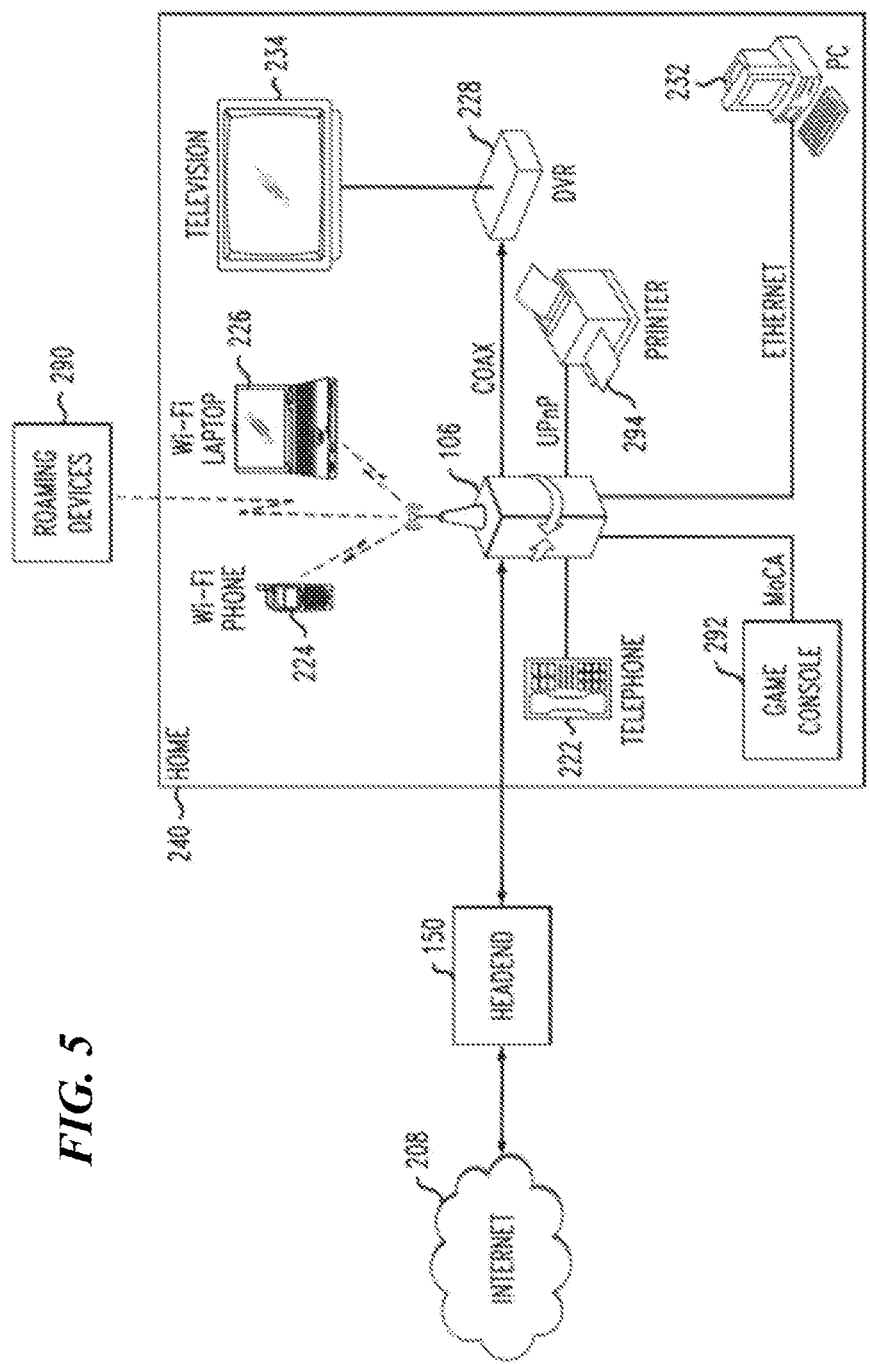
FIG. 5 is a functional block diagram of a premises network, including an exemplary centralized customer premises equipment (CPE) unit, interfacing with a head end such as that of FIG. 3.
Figure 6:
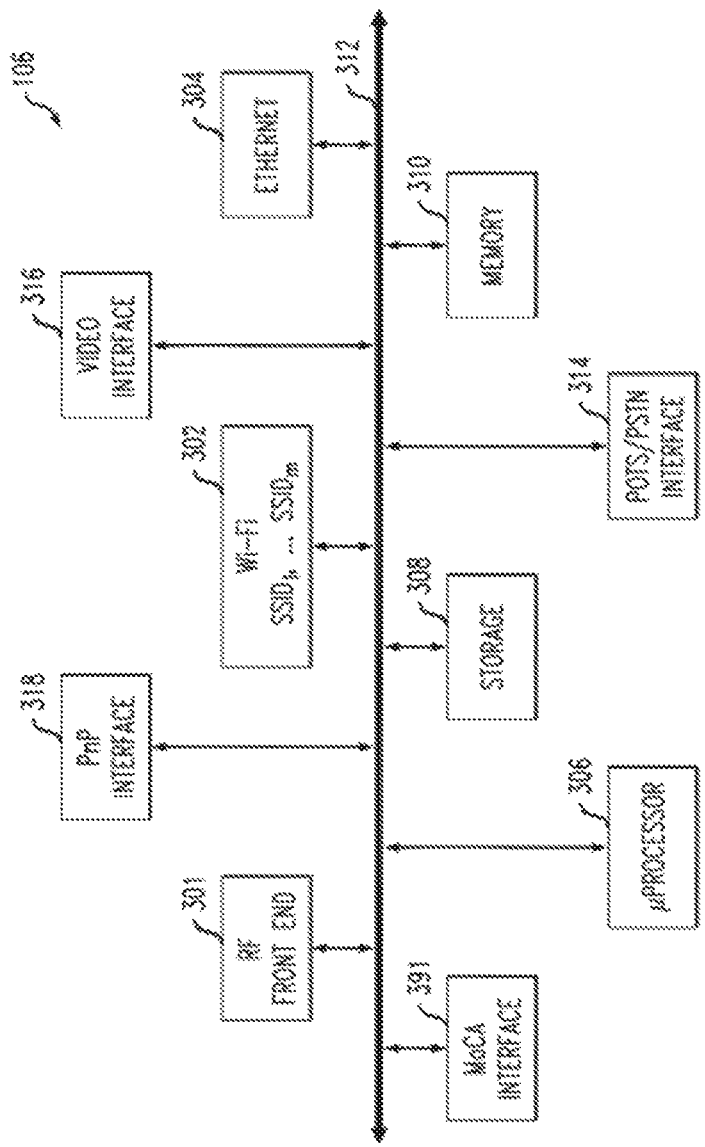
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 120.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Again, it should be noted that some embodiments provide a cloud-based user interface, wherein CPE 106 accesses a user interface on a server in the cloud, such as in NDC 120.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments provide a cloud-based user interface, wherein CPE 106 accesses a user interface on a server in the cloud, such as in NDC 120.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to "broadcast" content (e.g., video programming), the systems of FIGS. 1-6 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

According to an embodiment of the present invention, data corresponding to user consumption of a resource (e.g., service usage) is normalized by time sequence sampling or timestamping. Timestamp normalized data enables enhanced reporting methods.

In one or more embodiments of the present invention, the data is captured on a per subscriber basis (e.g., from a cable modem of a subscriber) and/or per service group (e.g., one or more cable modems). In one or more exemplary embodiments, the data is captured at times determined by a driver for IPDR. For example, the driver for IPDR generates a polling solution that can lack time-regularity for individual counter-read events; in one or more exemplary embodiments the counters are polled/read when the CMTS has sufficient free transmission cycles to report counter data to a poller, and is thus less intrusive than regularly scheduled polling. Exemplary embodiments of the present invention timestamp normalize the IPDR data having irregular time-ranges/timestamps, enforcing a time-range-framing over the irregular timestamps in the IPDR data.

In one or more exemplary embodiments of the present invention, the data is IPDR data, Simple Network Management Protocol (SNMP) data, or a combination of IPDR and SNMP data with separate normalization. In another exemplary embodiment, the data is formatted according to an Internet Protocol Flow Information Export (IPFIX) standard, wherein IPFIX defines how IP (Internet Protocol) flow information is to be formatted and transferred from an exporter to a collector. It should be understood that the systems and methods described herein are not limited to the disclosed data formats or standards, and that exemplary embodiments are applicable to other data formats. The following description refers to an exemplary IPDR implementation. Again, aspects of the exemplary implementation are applicable to other types of data.

Figure 8:
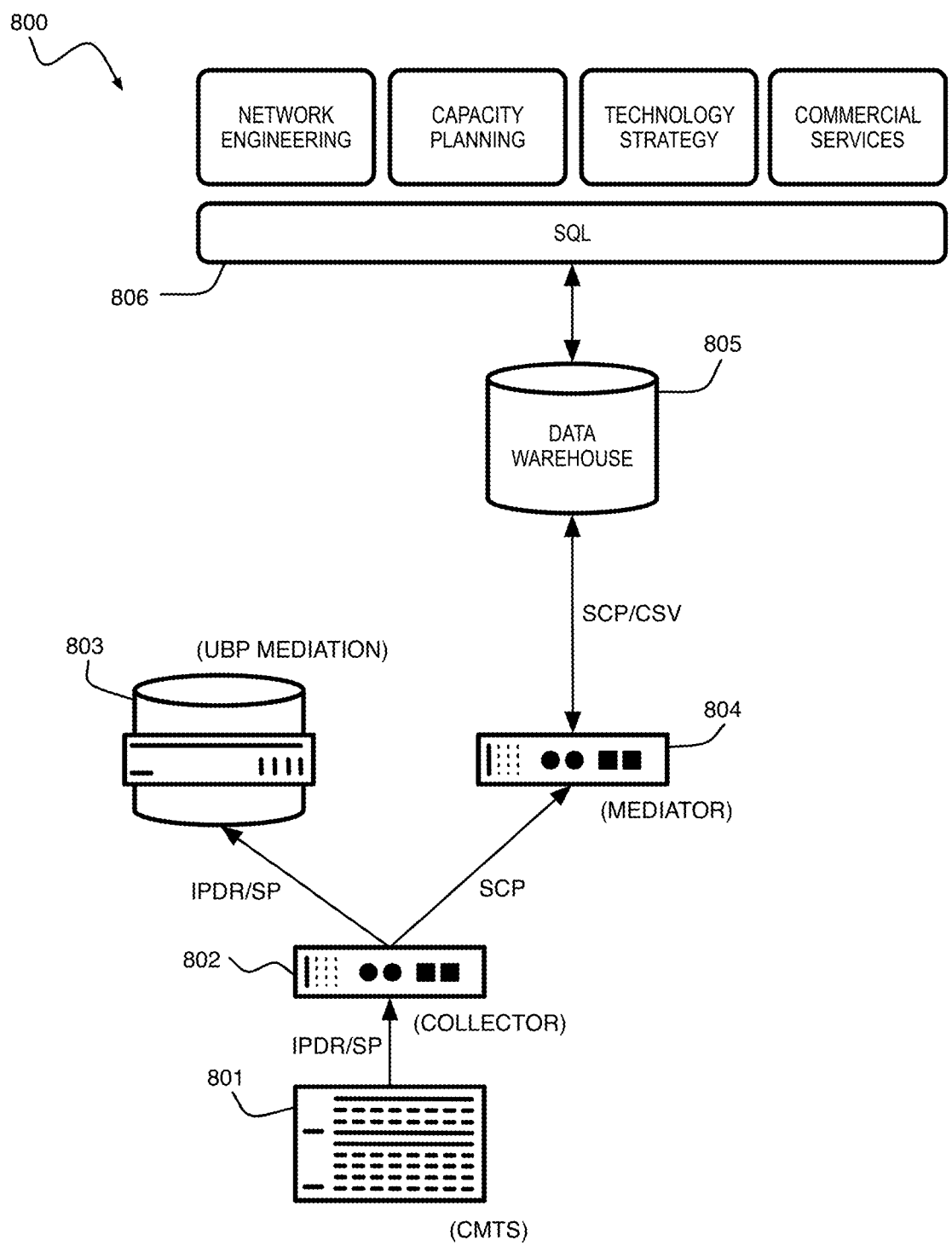
FIG. 8 illustrates network architecture according to an embodiment of the present invention.

FIG. 8 is an exemplary architecture of a network 800 processing IPDR data according to an embodiment of the present invention. In the network 800, a CMTS 801 is disposed for example in a headend and receives raw data from consumer devices (not explicitly shown) (e.g., set-top devices). The CMTS 801 embodies a counter or flow counter (referred hereinafter as a "counter"). In at least one embodiment, the counter gives speed value (MB/s) or a running total number of octets (bytes) of traffic or packets through an interface of the CMTS 801. The CMTS 801 gathers counter data (e.g., raw data from a cable modem in a service group of the CMTS) at irregular intervals. The CMTS 801 communicates the raw data to a collector 802 disposed at a regional data center. It should be understood that the collector 802 can be disposed at different locations and is not limited to deployment at a regional data center. The collector 802 drives the raw data to a unit based pricing (UBP) mediation appliance 803 and a mediator 804. The mediator 804, also disposed at the regional data center, performs timestamp normalization on the raw data. In one or more exemplary embodiments of the present invention, a portion of the raw IPDR data can be correlated with SNMP data by timestamp normalization.

It should be understood that the mediator 804 can be disposed at different locations and is not limited to deployment at a regional data center. The mediator 804 outputs timestamp normalized data to a data warehouse 805. In one or more embodiments, the mediator 804 also outputs the raw data to the data warehouse 805. According to an embodiment of the present invention, business intelligence (BI) tools 806 are deployed to act on the data warehouse 805 for purposes of capacity planning, technology strategy, commercial services, etc. For example, the BI tools 806 can be deployed to determine where and when in the architecture certain usage occurred.

Within the network 800, the data being passed between elements can have various formats. For example, an IPDR Streaming Protocol (SP) is used to communicate raw data (e.g., counter values) from the CMTS to the collector 802 and the UBP mediation appliance 803. In at least one embodiment, the collector 802 uses a vendor neutral program information file format with secure copy (SCP). The mediator 804 and data warehouse communicate using extract, transform and load (ETL) processes with SCP for comma-separated values CSV files.

It should be understood that methods and formats of communication are non-limiting examples and that other methods and formats can be used.

Figure 9:
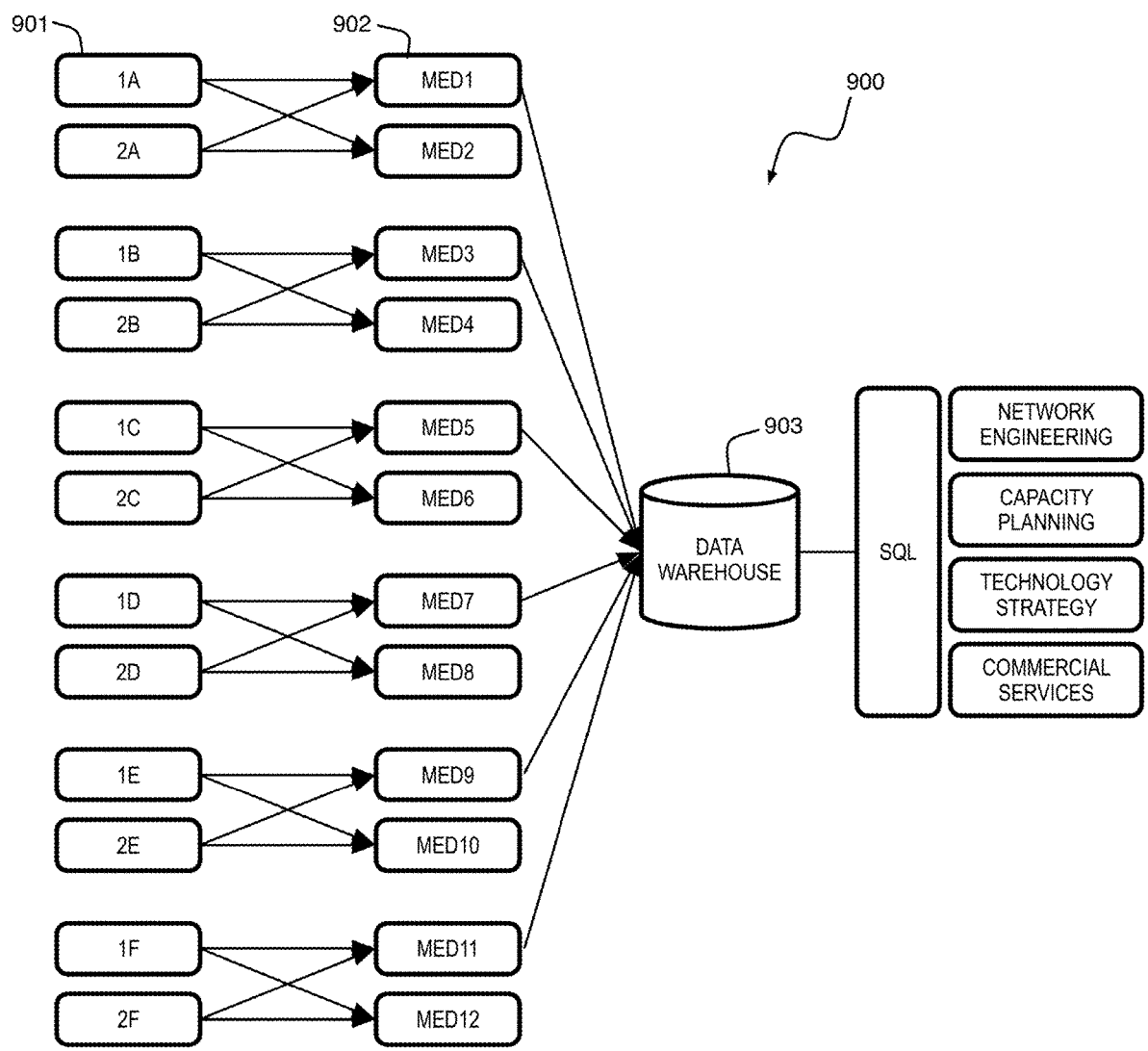
FIG. 9 illustrates a production topology according to an embodiment of the present invention.

According to an embodiment of the present invention, within the network 800, the mediator 804 normalizes timestamp data. Referring to FIG. 9, in an exemplary production topology 900, collector systems 901, are disposed throughout regional data centers (RDC). The collector systems drive the raw data including the counter values to the mediator systems 902. The mediator systems 902 timestamp normalize the raw data. More particularly, the mediator systems 902 normalize the counter values in the raw data to particular times (described in more detail with reference to FIGS. 10-12). The timestamp normalized data is provided to a data warehouse 903.

The timestamp normalized data stored at the data warehouse 903 enables granular (e.g., on the scale of minutes) analysis. For example, database queries (e.g., structured query language (SQL) queries) can be applied to the timestamp normalized SNMP data. In one example, statements about throughput can be aggregated across the network, with results applied to network engineering, capacity planning, technology strategy and commercial services.

Figure 10:
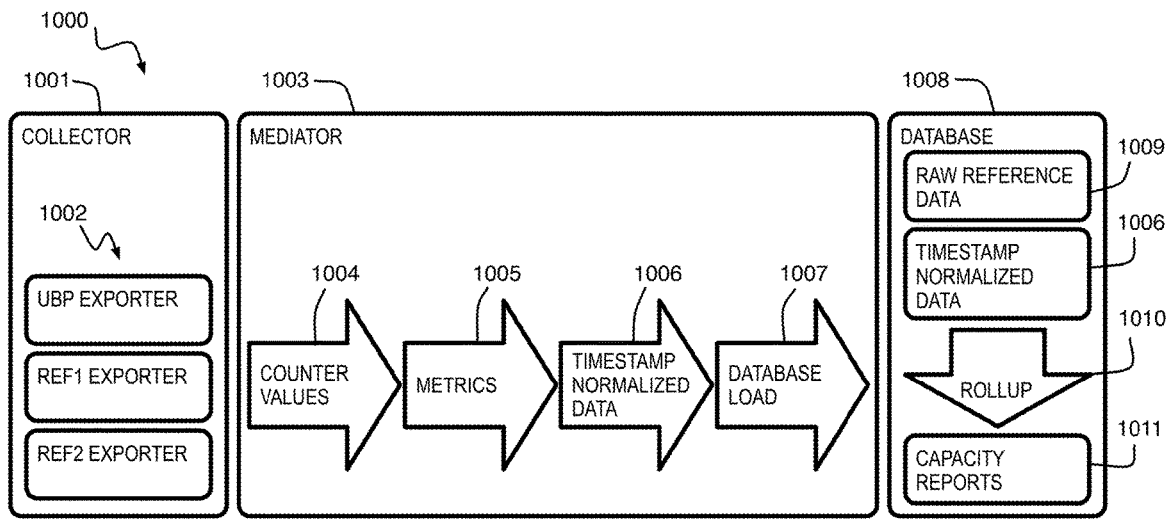
FIG. 10 illustrates a collector-mediator-database architecture according to an embodiment of the present invention.

Referring to FIG. 10, an exemplary collector-mediator-database architecture is illustrated. A collector 1001 comprises exporters 1002 for connected mediators and UBP appliances. A mediator 1003 receives raw IPDR data from the collector 1001. The mediator 1003 is configured to performed operations of receiving counter values and corresponding the timestamps when the values were read at 1004, applying metrics at 1005 (e.g., converting the counter values into ranged data), timestamp normalizing data at 1006 and performing a database load at 1007. In one or more exemplary embodiments of the present invention, a subset of the raw IPDR data can be correlated with SNMP data by timestamp normalization. A database 1008 receives the timestamp normalized data 1006 from the mediator 1003. The database 1008 further receives raw reference data 1009 (e.g., counter values). In one or more embodiments of the present invention, the database 1008 performs a rollup operation 1010 to produce capacity reports 1011.

The rollup operation 1010 includes operations such as correlation of data from multiple sources, correlation of IPDR data and SNMP data, repair of impairments in the timestamp normalized data (e.g., mitigating missing SNMP polls using IPDR data correlated to SNMP), generation of projections of future usage based on the timestamp normalized data 1006, etc. The rollup operation 1010 allows the timestamp normalized data to be rolled up into capacity and business intelligence reports. The reports can include information about IPTV traffic per service group, a comparison of residential versus commercial traffic per service group, etc. Other aggregations of clients are possible.

Figure 11:
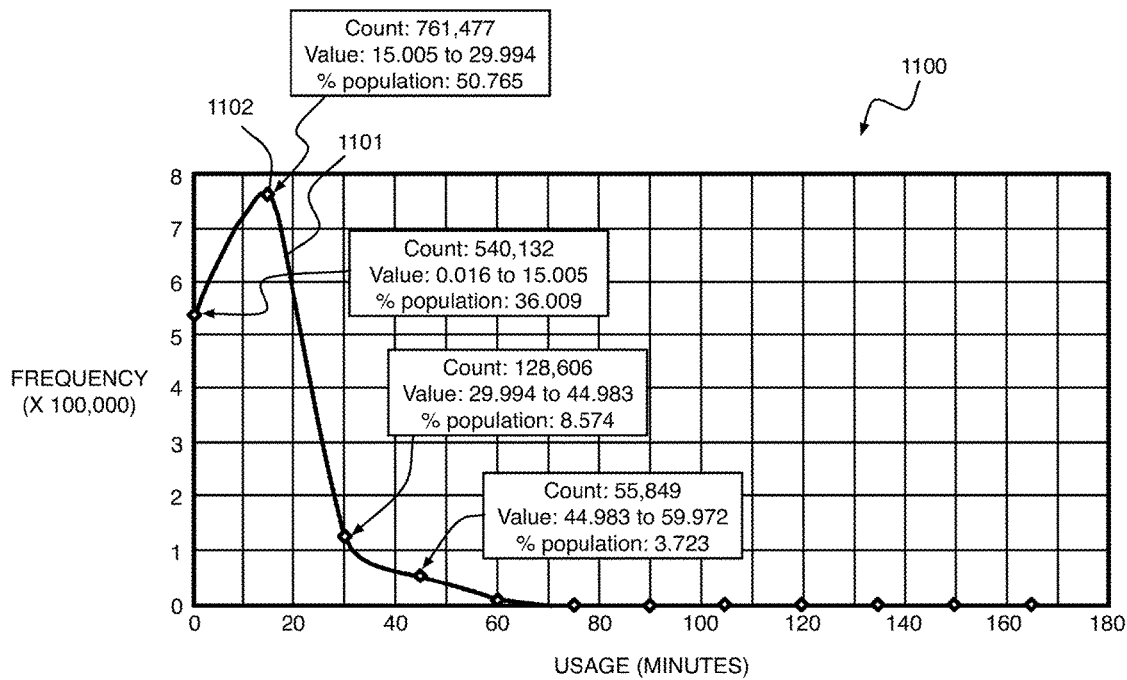
FIG. 11 is a graph of service consumption according to an embodiment of the present invention.

FIG. 11 is a graph 1100 of exemplary service consumption data according to an embodiment of the present invention. In FIG. 11 the distribution of service consumption 1101 is plotted as usage (in minutes) against a measure of frequency (i.e., consumer behavior). For example, at data point 1102 it can be observed that 761,477 subscribers, representing about 51% of the subscriber population, established sessions lasting between about 15 minutes and 30 minutes. The data of FIG. 11 illustrates subscriber behavior. The raw data resulting from the subscriber behavior is illustrated in FIG. 12 together with timestamp normalized SNMP data.

Figure 12:
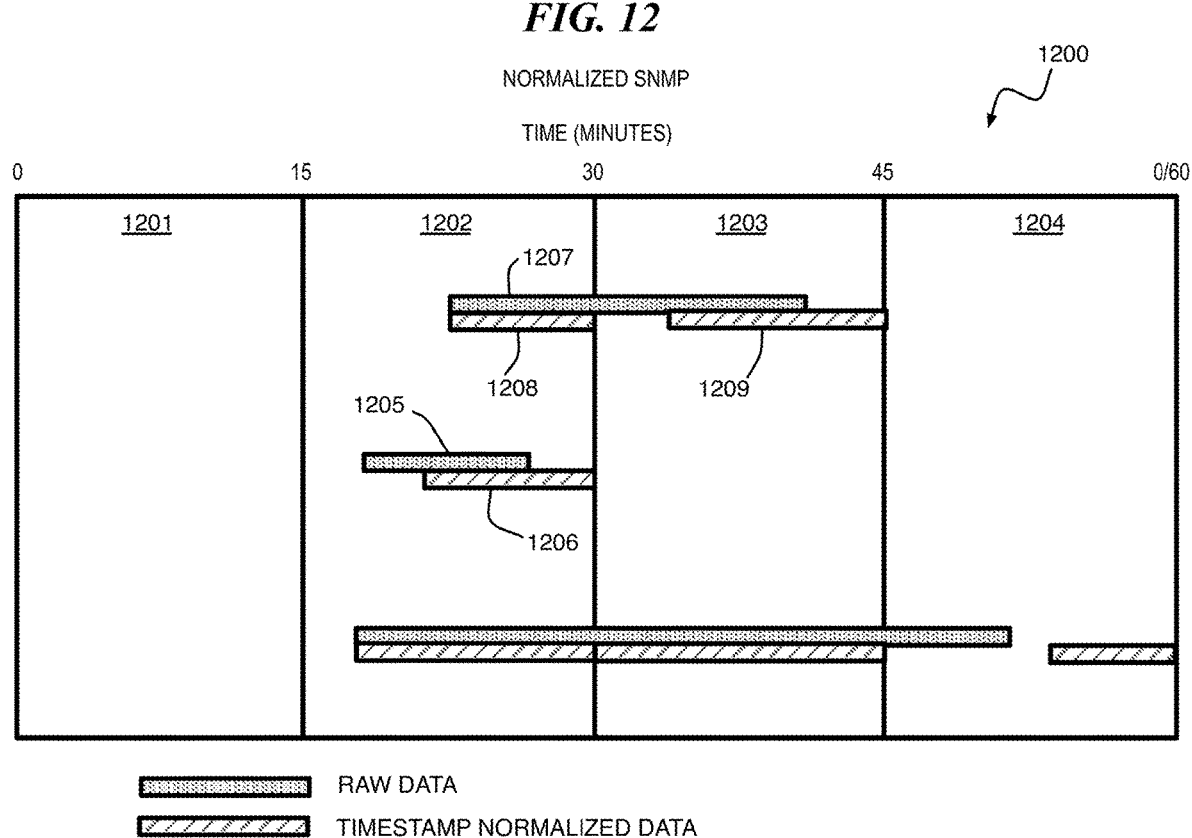
FIG. 12 is an illustration of timestamp normalized data according to an embodiment of the present invention.

FIG. 12 is an illustration 1200 of timestamp normalized data according to an embodiment of the present invention. In FIG. 12 60 minutes of time is divided into four timestamp buckets (1201-1204, respectively). The process of timestamp normalizing the raw data categorizes the raw data (e.g., data consumption) into the timestamp buckets. The raw data for different consumers is illustrated, e.g., 1205 and 1207, across these timestamp buckets. The mediators operate to timestamp normalize the raw data, converting the raw data into start and stop timestamps. For example, in the case of raw data 1205, the usage is normalized to the 30-minute bucket 1202. In another example, the raw data 1207 is normalized by dividing the usage data among two buckets 1202 and 1203. Therefore, the raw data 1207 is normalized into two separate occurrences at 1208 and 1209 at the 30-minute bucket 1202 and the 45-minute bucket 1203, respectively.

Figure 13:
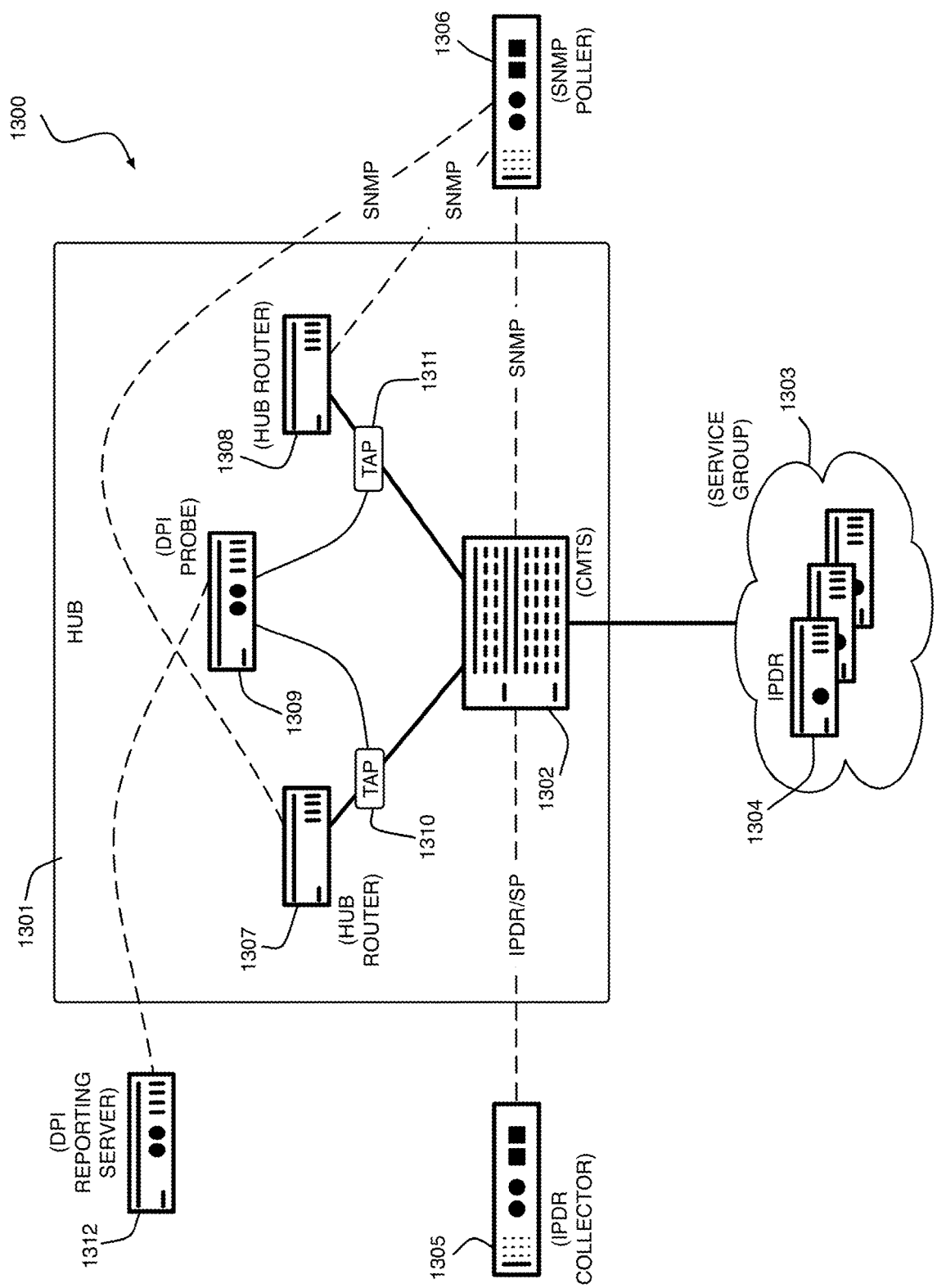
FIG. 13 illustrates network architecture including a hub site according to an embodiment of the present invention.

FIG. 13 is an exemplary architecture of a network 1300 processing data using a hub 1301 according to an embodiment of the present invention. The hub 1301 includes a CMTS 1302. The CMTS 1302 is associated with a service group 1303 comprising one or more subscriber devices 1304 (e.g., cable modems). The CMTS 1302 is disposed in communication with an IPDR collector 1305 and an SNMP poller 1306. The IPDR collector 1305 and the SNMP poller 1306 are further connected to respective mediators (for example, 803 and 804, FIG. 8) providing respective IPDR data and SNMP data to the mediators. According to an exemplary embodiment of the present invention, the data warehouse (see, for example, 805, FIG. 8) is configured to correlate of data from multiple sources, including IPDR data and SNMP data.

The SNMP poller 1306 polls the CMTS 1302 (e.g., on interface octet counters), from which interface utilization can be derived. As shown in FIG. 13, the SNMP poller 1306 can also poll the Hub Routers 1307 and 1308. In one or more embodiments of the present invention, the CMTS 1302 does not poll SNMP data from the cable modems (e.g., 1304). The data at the subscriber devices 1304 is IPDR based. In one or more exemplary embodiments of the present invention, a portion of the IPDR data can be correlated with SNMP data by timestamp normalizing the IPDR data.

The hub 1301 further includes one or more hub routers (e.g., 1307 and 1308). A Deep Packet Inspection (DPI) probe 1309 operates taps or inspection points (e.g., 1310 and 1311) between the CMTS 1302 and the hub routers 1307 and 1308. The DPI probe 1309 outputs counter data to a DPI reporting server 1312. DPI is useful in, for example, gathering statistical information about a usage pattern of a service group. Similar to the IPDR collector 1305 and the SNMP poller 1306, the DPI reporting server 1312 provides counter data to a mediator, which timestamp normalizes counter data collected by the DPI probe and makes the timestamp normalized data available in the data warehouse.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
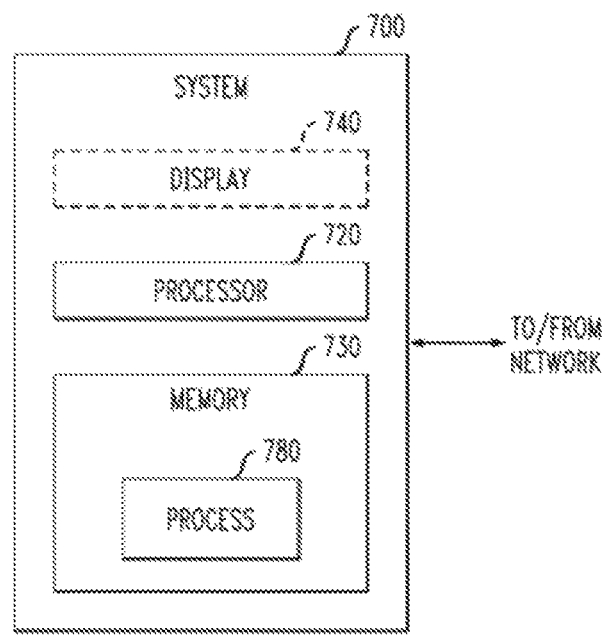
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in dedicated hardware (such as ASIC) rather than using software. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a virtualized or non-virtualized hardware server implementing one or more of the blocks/sub-blocks 1003, 1004, 1005, 1006, 1007, 1010 and the like, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement blocks/sub-blocks 1003, 1004, 1005, 1006, 1007, 1010, etc.). The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
collecting, over a time period, counter data corresponding to usage of a network resource, wherein the counter data includes timestamp data, and wherein the collection of the counter data is performed by a counter device at irregular intervals;
dividing the time period into a plurality of buckets, each of the buckets having a stop timestamp; and
converting the counter data into timestamp normalized counter data, wherein the conversion comprises:
dividing the counter data among the plurality of buckets according to the timestamp data of the counter data; and
enforcing a time-range-framing over the timestamp data of the counter data by converting a stop timestamp of the counter data to the stop timestamp of a respective one of the buckets containing the counter data,
wherein different portions of the timestamp normalized counter data are placed in different buckets of the plurality of buckets, and wherein at least one individual occurrence of the counter data overlapping at least a first bucket and a second bucket of the plurality of buckets is divided into a plurality of occurrences of the timestamp normalized counter data placed in at least said first and second buckets with the stop timestamps of the occurrences converted to the stop timestamps of the respective buckets, the timestamp normalized counter data supporting database queries.

2. The method of claim 1, further comprising storing the timestamp normalized counter data comprising the stop timestamps in a data warehouse.

3. The method of claim 1, wherein the counter data is collected from multiple sources on a network, the multiple sources comprising one of a plurality of subscribers, at least one subscriber and at least one service group, and a plurality of service groups.

4. The method of claim 3, further comprising repairing an impairment in the timestamp normalized data, wherein the counter data is Simple Network Management Protocol (SNMP) data and wherein the timestamped normalized data is normalized SNMP data, and wherein the repairing comprises mitigating a missing portion of the normalized SNMP data using Internet Protocol Detail Record (IPDR) data collected from a cable modem termination system (CMTS) providing the network resource to at least one subscriber among the multiple data sources and correlated to the SNMP data.

5. The method of claim 1, further comprising generating a projection of future usage of the network resource using the timestamp normalized counter data.

6. The method of claim 1, wherein the counter device is a cable modem termination system (CMTS) providing the network resource to at least one subscriber among the multiple data sources.

7. A network system comprising:
a counter providing a network resource to at least one subscriber of the network system;
a data warehouse;
a collector collecting, from the counter, counter data corresponding to usage of the network resource, wherein the counter data includes timestamp data; and
a mediator comprising at least one processor executing instructions stored in a memory to convert the counter data into timestamp normalized counter data, and storing the timestamped normalized counter data in the data warehouse, wherein the conversion of the counter data includes dividing the counter data among a plurality of buckets according to the timestamp data of the counter data and enforcing a time-range-framing over the timestamp data of the counter data by converting a stop timestamp of the counter data to a stop timestamp of a respective one of the buckets containing the counter data, wherein different portions of the timestamp normalized counter data are placed in different buckets of the plurality of buckets, and wherein at least one individual occurrence of the counter data overlapping at least a first bucket and a second bucket of the plurality of buckets is divided into a plurality of occurrences of the timestamp normalized counter data placed in at least said first and second buckets with the stop timestamps of the occurrences converted to the stop timestamps of the respective buckets, the timestamp normalized counter data supporting database queries,
wherein the collector and the mediator are disposed between the counter and the data warehouse.

8. The network system of claim 7, wherein the data warehouse comprises a rollup module configured to repair an impairment in the timestamp normalized counter data, wherein the counter data is Simple Network Management Protocol (SNMP) data and wherein the timestamped normalized data is normalized SNMP data, and wherein the repair comprises mitigating a missing portion of the normalized SNMP data using Internet Protocol Detail Record (IPDR) data collected from the counter and correlated to the SNMP data.

9. The network system of claim 7, wherein the data warehouse comprises a rollup module configured to generate a projection of future usage of the network resource using the timestamp normalized counter data.

10. The network system of claim 7, wherein the counter data includes first counter data corresponding to usage of the network resource by a service group including the at least one subscriber, and second counter data corresponding to usage of the network resource by a first subscriber of the at least one subscriber.

11. The network system of claim 7, wherein the collector comprises an Internet Protocol Detail Record (IPDR) collector collecting IPDR data from the counter and a Simple Network Management Protocol (SNMP) poller polling SNMP data from the counter.

12. The network system of claim 7, further comprising:
a Deep Packet Inspection (DPI) probe operating at least one tap between the counter and a hub router; and
a DPI reporting server collecting SNMP data from the DPI probe,
wherein the DPI probe and DPI reporting server are confirmed as the collector collecting, from the counter, the counter data corresponding to usage of the network resource.

13. An article of manufacture comprising a computer program product for timestamp normalizing counter data, the computer program product comprising:
a computer-readable recordable storage medium storing non-transitory computer readable program code, the computer readable program code comprising:
computer readable program code executed by at least one processor to collect, over a time period, counter data corresponding to usage of a network resource, wherein the counter data includes timestamp data, and wherein the collection of the counter data is performed by a counter device at irregular intervals;
computer readable program code executed by at least one processor to divide the time period into a plurality of buckets, each of the buckets having a stop timestamp; and
computer readable program code executed by the at least one processor to convert the counter data into timestamp normalized counter data by dividing the counter data among the plurality of buckets according to the timestamp data of the counter data and enforcing a time-range-framing over the timestamp data of the counter data by converting a stop timestamp of the counter data to the stop timestamp of a respective one of the buckets containing the counter data, wherein different portions of the timestamp normalized counter data are placed in different buckets of the plurality of buckets, and wherein at least one individual occurrence of the counter data overlapping at least a first bucket and a second bucket of the plurality of buckets is divided into a plurality of occurrences of the timestamp normalized counter data placed in at least said first and second buckets with the stop timestamps of the occurrences converted to the stop timestamps of the respective buckets.

14. The article of manufacture of claim 13, further comprising computer readable program code executed by the at least one processor to store the timestamp normalized counter data in a memory device supporting database queries on the timestamp normalized counter data.

15. The article of manufacture of claim 13, further comprising computer readable program code executed by the at least one processor to correlate the counter data from multiple sources on a network, the multiple sources comprising one of a plurality of subscribers, at least one subscriber and at least one service group, and a plurality of service groups.

16. The article of manufacture of claim 15, further comprising computer readable program code executed by the at least one processor to repair an impairment in the timestamp normalized data, wherein the counter data is Simple Network Management Protocol (SNMP) data and wherein the timestamped normalized data is normalized SNMP data, and wherein the repairing comprises mitigating a missing portion of the normalized SNMP data using Internet Protocol Detail Record (IPDR) data collected from a cable modem termination system (CMTS) providing the network resource to at least one subscriber among the multiple data sources and correlated to the SNMP data.

17. The article of manufacture of claim 13, further comprising computer readable program code executed by the at least one processor to generate a projection of future usage of the network resource using the timestamp normalized counter data.

* * * * *